Oct. 14, 1958 R. M. SMITH 2,856,119
REFRIGERATING APPARATUS
Filed Dec. 19, 1952 6 Sheets-Sheet 1

INVENTOR.
Rolf M. Smith
BY Willits Hardman and Fehr
Attorneys

Oct. 14, 1958 R. M. SMITH 2,856,119
REFRIGERATING APPARATUS
Filed Dec. 19, 1952 6 Sheets-Sheet 2

INVENTOR.
Rolf M. Smith
BY
Willits Hardman and John
Attorneys

Oct. 14, 1958

R. M. SMITH 2,856,119

REFRIGERATING APPARATUS

Filed Dec. 19, 1952

INVENTOR.
Rolf M. Smith
BY
Willits Hardman and Fehr
Attorneys

INVENTOR.
Rolf M. Smith

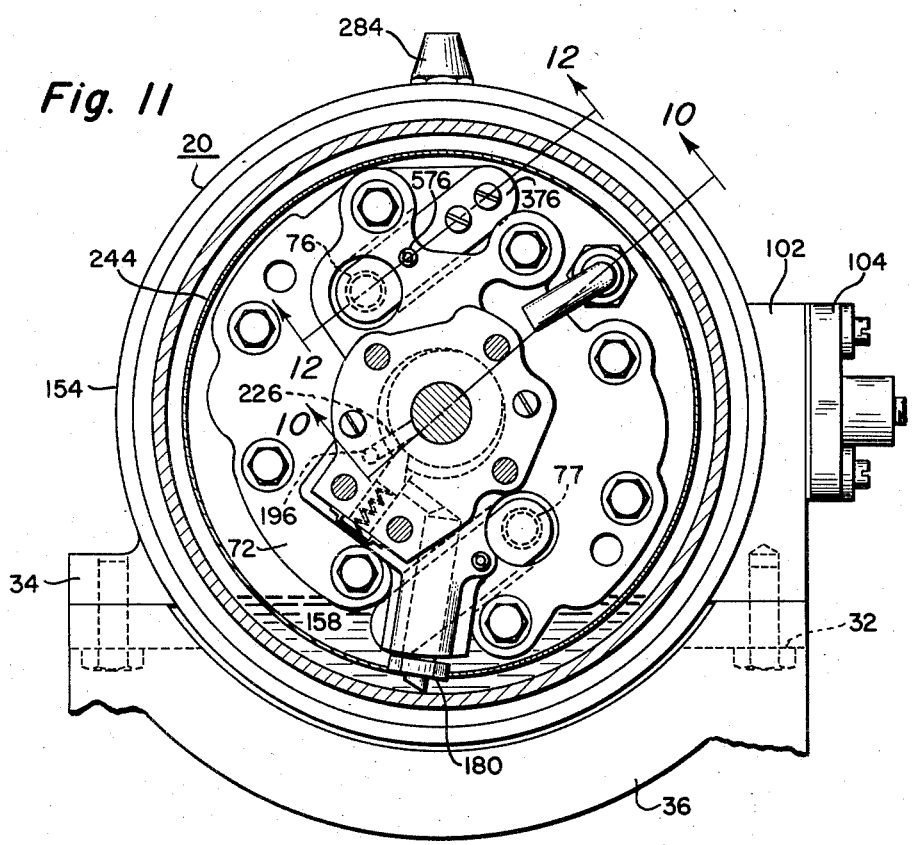
Fig. 11
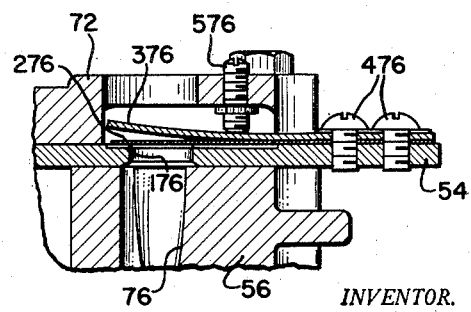
Fig. 13
Fig. 12
INVENTOR.
Rolf M. Smith
BY Willits Hardman and Fehr
Attorneys Oct. 14, 1958  R. M. SMITH  2,856,119
REFRIGERATING APPARATUS
Filed Dec. 19, 1952  6 Sheets-Sheet 6

INVENTOR.
Rolf M. Smith
BY Willits Hardman and Fehr
Attorneys

United States Patent Office 2,856,119
Patented Oct. 14, 1958

2,856,119

REFRIGERATING APPARATUS

Rolf M. Smith, Dayton, Ohio, assignor to General Motors Corporation, Detroit, Mich., a corporation of Delaware Application December 19, 1952, Serial No. 326,924

9 Claims. (Cl. 230—145)

This application is a continuation-in-part of my co-pending applications S. N. 243,799, filed August 27, 1951 and issued on January 24, 1956, as Patent No. 2,732,126, and S. N. 282,019, filed April 12, 1952, which issued on August 7, 1956, as Patent 2,757,858. This invention relates to refrigerating apparatus and more particularly to pumps and compressors which may be required to operate satisfactorily at all speed ranges.

In most refrigerating apparatus the compressor is driven at its optimum speed by a constant speed motor. For automobile air conditioning the compressor may be most conveniently driven by the engine used to drive the car. Under such circumstances, the compressor will be required to operate at a speed directly proportional to the car speed when the car is in high gear and at proportionally higher speeds in other gears. The compressor will be operated at high speeds when the car is driven by a fast driver in the open country and at slower speeds in cities and towns and by slower drivers.

It is an object of my invention to provide a compact compressor which can operate efficiently and at high capacity over a wide range of speeds.

It is another object of my invention to provide a compressor which can be directly connected to the engine of an automobile and operate without failure throughout the life of the car.

These objects are attained by providing a counterbalanced rotary two-vaned eccentric roller type compressor with inlet ports on both sides located to provide high volumetric efficiency over a wide range of speeds. A forced feed oiling system is provided which first delivers oil to the shaft seal and thence to other bearing surfaces. The coolest oil is circulated. The refrigerant and oil are filtered or screened. Self-sealing refrigerant suction and discharge connections are provided. The shaft seal and the main bearing are cooled by the incoming refrigerant.

Further objects and advantages of the present invention will be apparent from the following description, reference being had to the accompanying drawings wherein a preferred form of the invention is clearly shown.

In the drawings:

Figure 11 is a sectional view taken substantially along the line 11—11 of Figures 2 and 10;

Figure 12 is a fragmentary sectional view taken substantially along the line 12—12 of Figure 11;

Figure 13 is a side view of the pulley shown in Figure 2;

Figure 1:
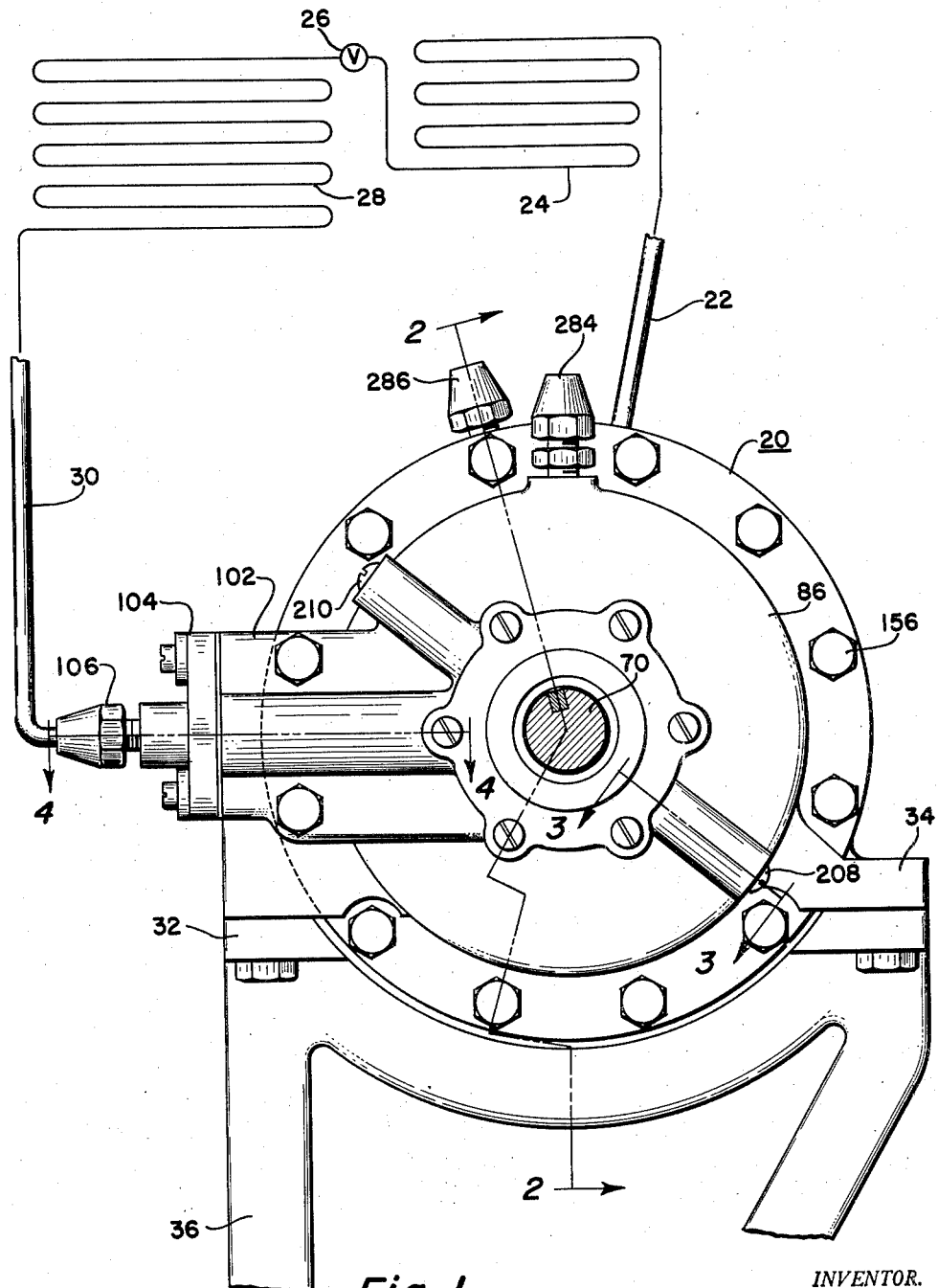
Figure 1 is an end view of my compressor taken substantially along the line 1—1 of Figure 2 together with a diagrammatic representation of the remaining portions of a refrigerating system.
Figure 2:
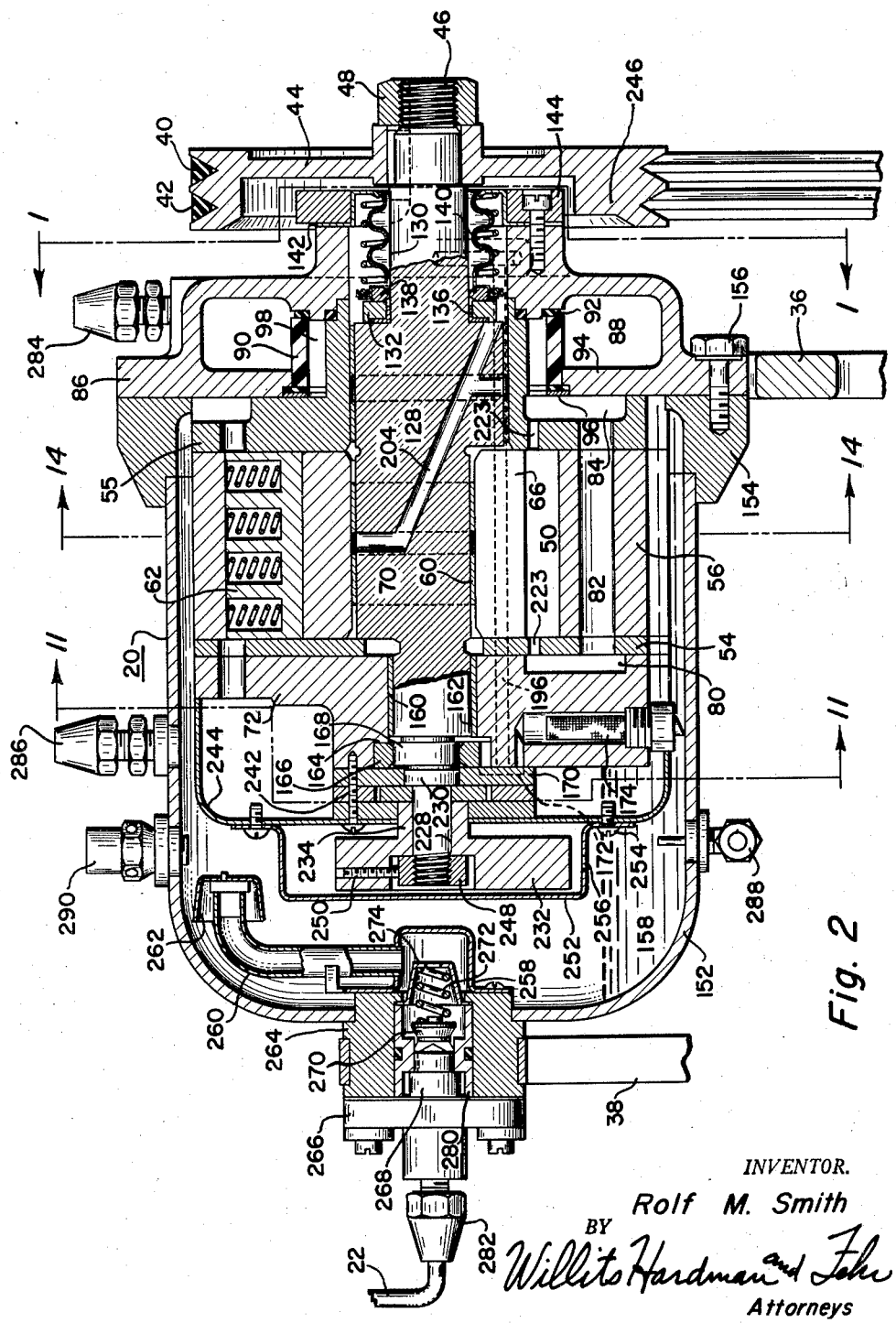
Figure 2 is a sectional view taken substantially along the line 2—2 of Figure 1.
Figure 3:
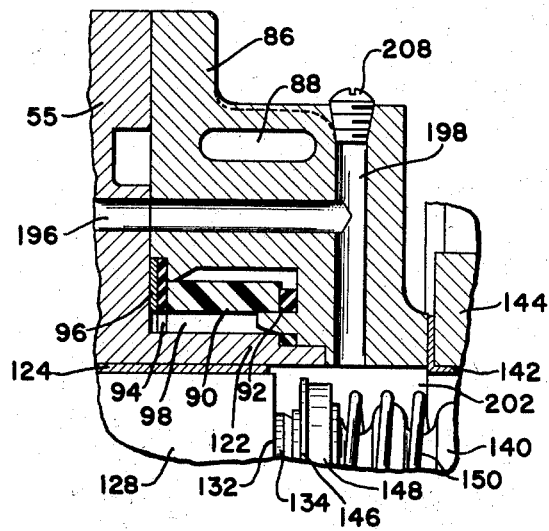
Figure 3 is a fragmentary sectional view taken substantially along the line 3—3 of Figure 1.

Referring now to the drawings and more particularly to Figure 1, there is shown a sealed motor-compressor unit 20 which compresses the refrigerant and forces the compressed refrigerant through the pipe 22 to a condenser 24 where the refrigerant is liquefied. The liquefied refrigerant flows from the condenser 24 through a liquid refrigerant control means such as the valve 26 to an evaporator 28. In the evaporator 28, the liquid refrigerant evaporates under reduced pressure to provide refrigeration. This evaporated refrigerant is returned through the suction conduit 30 to the inlet of the compressor 20. When use in an automobile, the compressor unit is provided with projections 32 and 34 by which it may be fastened to a bracket 36 which may be fastened to the engine. An additional bracket 38 likewise fastened to the engine may be connected to the compressor 20 at its opposite end. The compressor may be driven directly from a pulley driven by the engine through two V-belts 40 and 42. These V-belts 40 and 42 ride in the pulley grooves of a pulley 44 which is keyed to the end of the compressor shaft 46 and fastened thereto by a nut 48.

*The compressor elements*

Figure 10:
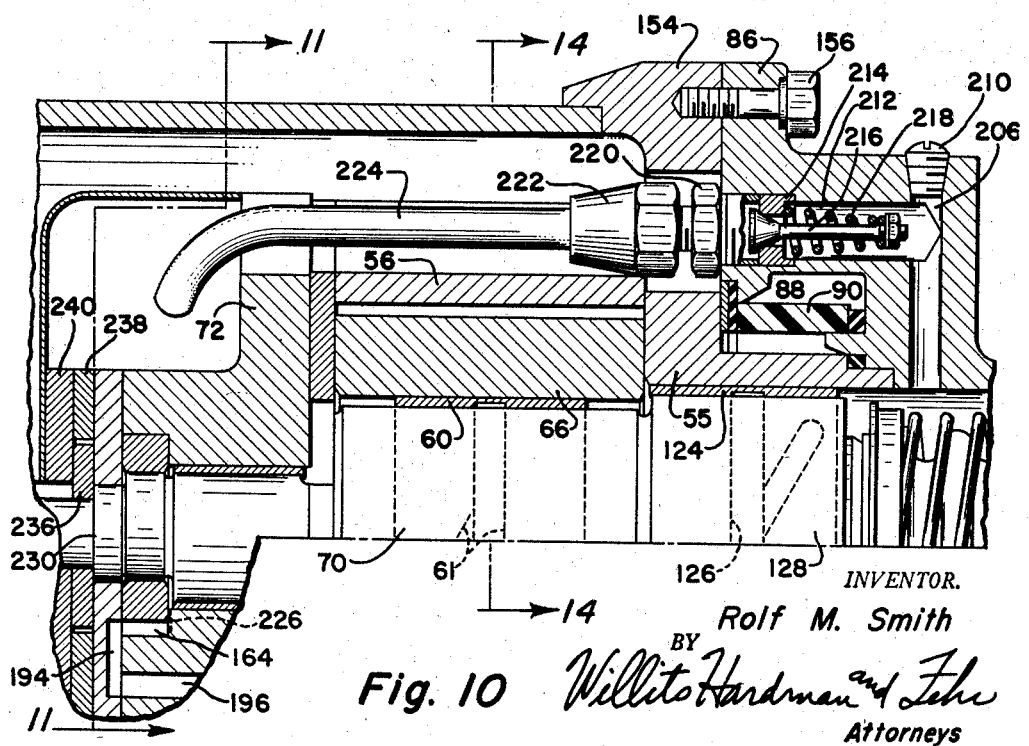
Figure 10 is a fragmentary sectional view taken substantially along the line 10—10 of Figure 11.

Within the compressor there is provided an impeller chamber 50 formed by a cylinder 56 and side members 54 and 55 which fit on opposite sides of this cylinder 56. Within the impeller chamber 50 there is a roller 66 provided with a steel-backed babbitt bearing 60 having lubricant distributing grooves 61 as illustrated in Figure 10. This bearing 60 fits onto the main eccentric portion 70 of the drive shaft 46 with sufficient clearance to make a satisfactory bearing arrangement.

The impeller chamber 50 is divided into two pumping chambers 143 and 145 by the two vanes 62 and 64 which are located 180° apart. Each of these vanes are provided with compression springs 68 which resiliently hold the vanes 62 and 64 into contact with the periphery of the roller impeller 66. The high pressure gas acting on the outer ends of the vanes 62 and 64 assists the springs 68 in holding the vanes in contact with the impeller 66. The side walls 54 and 55 of the impeller chamber 50 are each provided with diametrically opposite inlet ports 221 and 223.

The use of two vanes instead of a single vane makes possible an increase in capacity of the compressor as much as 60% without increasing the size of the compressor. This results from the fact that when two vanes are used, one of the compression spaces is discharged every 270°, while in a single-vane compressor, there is a discharge from the compression space every 360°.

The dual inlet ports

The inlet ports cannot be placed in the peripheral wall of the cylinder without employing a check valve as can be done in a single-vane compressor. To attain the maximum output from a two-vane compressor, it is necessary that there be free inlet flow into the compression space through the inlet port, and the inlet port must be rapidly and sharply closed at the proper time. This requires an inlet port arrangement which allows free flow of gas from the annular space 36 into each of the compression spaces during the suction stroke. This free flow makes it possible to make full use of the inertia of the gas flowing into the compression chamber so as to obtain the maximum capacity and efficiency.

Figures 5 to 9 show one particular shape of inlet port and one particular location of such ports. This example is based upon a rotary compressor having an inner cylinder diameter of approximately 3¼ inches (3.2473), an impeller diameter 2.8373 inches, and an eccentricity of .205 inch. The inlet ports 221 and 223 are located in both side walls so that they will be closed about 245° in advance of the completion of the compression stroke. The ports are shaped and located as follows: A circle having a radius of .205 inch, which is the designed eccentricity, is laid out. On this circle, there is located a point 245° in advance of the vane which determines the location of the completion of the compression stroke. From this point, there is inscribed an arc having a radius equal to the radius of the impeller 66, namely, 1.418 inches approximately.

The inner edge of the port is not particularly critical and may be formed as desired to make a port of adequate cross-sectional area. In the present example, the inner edge of each inlet port is made by inscribing an arc from the center of the axis of the drive shaft 30. The length of this arc is slightly less than the radius of the impeller minus the eccentricity. This edge substantially coincides with the path of the edge of the impeller 66. The exact value chosen is the radius of 1.187 inches. The inlet ports extend in the clockwise direction substantially until they meet the edge of the adjacent vane such as the vanes 62 and 64. The inlet ports extend in the opposite direction substantially to the meeting point of the two arcs.

Figure 5:
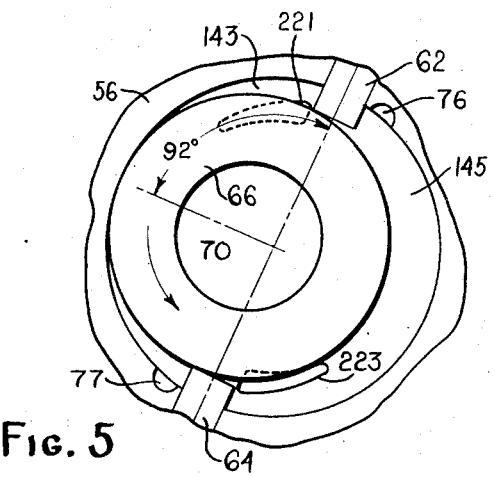
Figure 5 is a view partly diagrammatic showing the location of the impeller relative to the upper inlet port at the initial opening of the port about 92° after the beginning of the suction stroke.
Figure 7:
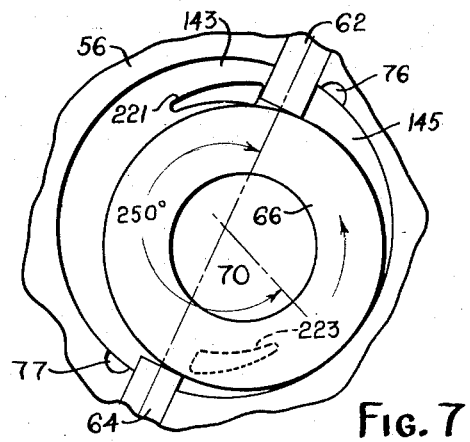
Figure 7 is a view similar to Figures 5 and 6 showing the last position of the impeller in which the upper port is completely uncovered after about 250° after the beginning of the suction stroke.
Figure 6:
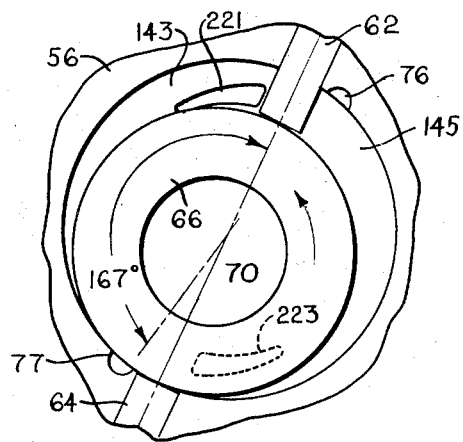
Figure 6 is a similar view showing the first position in which the upper port is completely uncovered after about 167° of the suction stroke.
Figure 9:
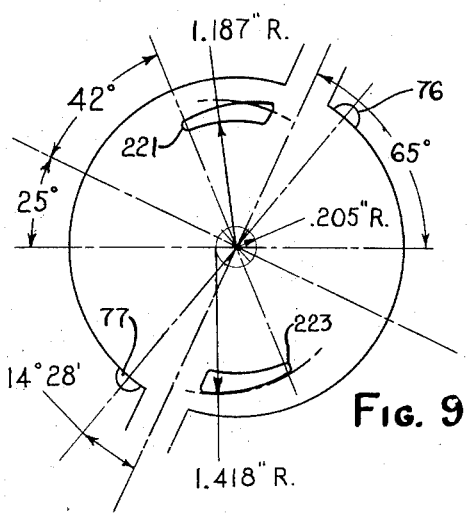
Figure 9 is a diagrammatic view illustrating the location and the shape of the inlet and outlet ports.
Figure 8:
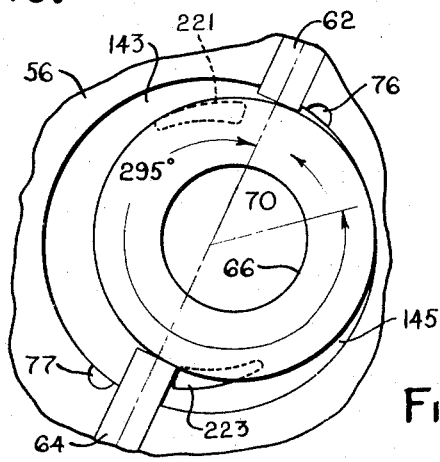
Figure 8 is a view similar to Figures 5 to 7 showing the first position in which the upper port is completely covered to terminate the suction stroke after about 295° of the revolution to begin the compression of gas.

With the inlet ports so laid out, the upper inlet port 221 will begin to open after the suction stroke proceeds about 90° as shown in Figure 5. The inlet port 221 will be fully open after the impeller 66 has been moved through about 167° in the suction stroke as shown in Figure 6. The impeller 66 will begin to close the suction port 221 after it has been revolved through about 250°. The inlet port 221 will be completely closed when the impeller 66 has revolved about 295° after the beginning of the suction stroke or about 245° in advance of the completion of the compression stroke. This will insure efficient operation of the compressor when the suction gas is at a medium density. To obtain maximum efficiency when a lighter gas is used, the point on the .205 inch circle should be more than 245° in advance of the completion of the compression stroke with a limit of about 270°. For a more dense suction gas, the point on the .205 inch circle should be less than 245° in advance of the completion of the compression stroke with a limit of about 210°. The extreme limits of this inlet closing point on the .205 inch circle should be between about 270° and 210° in advance of the completion of the compression stroke.

By the use of dual inlet port arrangement in which the impeller is used to cover and uncover the dual inlet ports at the proper time, there are provided mechanically opened and closed inlets without the use of any additional working parts. Reliability of the compressor is thereby increased, and by reason of the large area possible and the quick opening and closing, a maximum amount of suction gas can be drawn into the compression space. This assures high capacity and high volumetric efficiency.

The pumping chambers 143 and 145 are provided with outlet ports 76 and 77. Each of these ports 76 and 77 connect with a valve seat such as the valve seat 176. The valve seat 176 is provided with a flapper valve 276. The flapper valve 276 is provided with a curled leaf type stop member 376. Both the flapper valve 276 and the valve spring stop 376 are fastened to the side wall 54 by the screws 476. The valve spring stop 376 is adjusted by a setscrew 576 extending through the wall of the side wall housing 72 to limit the opening and bending of the flapper valve 276.

The inlet ports 223 in the side wall 54 are connected by a passage 80 in the side wall housing 72 with a horizontal passage 82 which extends from the passage 80 through the side wall 54, the cylinder 56 and the side wall 55. The inlet port 221 in the side wall 54 connects to similar passages. The side wall 55 is provided with an annular groove 84 which connects directly with the inlet ports 221 and 223 in the side wall member 55 and through additional passages like the passages 82 and 80 connect with both the inlet ports 221 and 223 in the side wall member 54.

The refrigerant filter

The annular groove 84 is closed by the end member 86 which is provided with an annular cavity 88. This annular cavity 88 is divided into an inner annular portion 98 and an outer annular portion by a ring-shaped porous filter 90. This filter is made of phenol formaldehyde resin and paper. The largest particle that will pass through the filter is size 40. The filter is so large in area and is so porous that the restriction it provides is very small, for example about a half-pound pressure difference. This filter 90 is pressed against a resilient seal member 92 on one wall of the cavity 88. A seal member 94 and a metal ring 96 are held in place by the side wall 55 to firmly hold the opposite side of the filter 90. The passage 84 in the side wall member 55 connects directly with the inner annular space 98 within the filter 90.

The automatically closing suction connection

Figure 4:
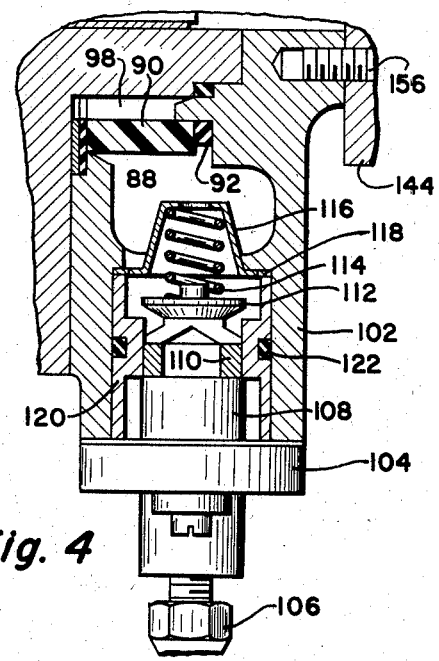
Figure 4 is a fragmentary sectional view taken substantially along the line 4—4 of Figure 1.

As shown in Figure 4, the outer annular space of the cavity 88 connects directly to the suction inlet 102 of the compressor. It is provided with a self-sealing detachable suction connection. This includes a valve fitting 104 which may, if desired, be provided with a manually closable shut-off valve. This valve fitting is provided with a flare connection 106 providing a connection directly with the suction line tubing 30. The valve fitting 104 is provided with an inwardly extending projection 108 used to engage the valve guide 110 of the automatic valve 112 to hold the valve 112 in the open position whenever the fitting 104 is connected to the compressor 20. The valve 112 is urged to the closed position by a compression type coil spring 114 extending between the valve 112 and the spring retainer 116. The outer edges of the spring retainer 116 rest against a shoulder 118 provided in the inlet passage. It is held in placed by a sleeve 120 fitting into the suction inlet 102. This sleeve 120 is sealed to the inlet by a gasket 122. The sleeve 120 also serves as a guide for the guide portion 110 of the valve 112. The suction inlet 102 opens directly into the annular cavity 88 as shown in Figure 4. When the fitting 104 is removed, the projecting portion 108 is removed with it to allow the spring 114 to quickly move the valve 112 to closed position. This prevents the escape of refrigerant from the compressor.

The shaft seal

The side wall member 55 is provided with a projecting portion 122 provided with a steel-backed babbitt bearing 124 having distributing grooves 126 as shown in Figure 10. This bearing 124 supports the main bearing portion 128 of the drive shaft 46. At the side of the main bearing portion 128 is a shaft portion 130 of reduced diameter. Between the main bearing portion 128 and the reduced shaft portion 130 is a stepped shoulder 132. Fitted against this shoulder 132 is a hardened seal ring 134 preferably of nitraloy. This seal ring is provided with an L-shaped gasket 136 of synthetic rubber. The shoulder 132 has a projecting portion which fits against the L-shaped gasket 136 to seal the ring 134 to the shoulder 132.

Fitting against the seal ring 134 is a ring of leaded bronze 138 sealed to a bellows 140. The other end of this bellows 140 is connected to an end plate 142 fastened to the end of the housing 86 by a ring 144 which is fastened by screws as shown. The shaft seal is constructed substantially like the seal described in the McCormack Patent 2,296,724 and it is balanced in the manner illustrated in the Rowe Patent 2,010,930. The purpose of this balanced arrangement is to prevent the seal from being affected or opened by excessive pressure differentials. The seal includes an improvement over the construction shown in these prior patents. The seal ring 138 is provided with a split washer 146. The two halves of this split washer are held together in contact with the ring 138 by a spring retainer 148. This spring retainer 148 is in the form of a ring which is U-shaped in cross section. One end of the coil spring 150 is retained within this spring retainer 148 while the other end of the spring 150 rests against the end plate 142.

The lubricating system

The compressor is provided with a housing which includes a large cup-shaped steel member 152 sealed at its open end to a ring 154 fastened to the end housing member 86 by the screws 156. This housing 152 surrounds the impeller casing which is composed of the cylinder 56 and the wall members 54, 55 and 72. There is sufficient space between the housing 152 and the impeller casing to provide a lubricant reservoir 158. The space above this lubricant reservoir 158 receives the discharge of compressed refrigerant which passes the flapper valves 276.

The housing member 72 is provided with a steel bearing 160 within which is mounted the second main bearing portion 162 of the compressor shaft 46. On one face of this housing 72 there is provided a recess 164 within which there is provided an oil pump impeller ring 166 which is rotatably mounted upon an eccentric portion 168 upon the drive shaft 46 at the side of the bearing portion 162. The recess 164 is closed by a ring 170 and is provided with an inlet passage 172 into the pumping chamber of the oil pump.

Figure 15:
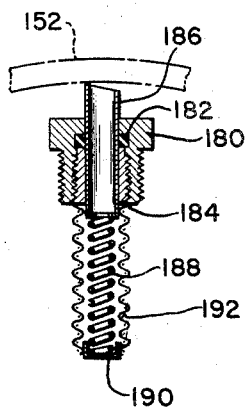
Figure 15 is a fragmentary view showing the oil suction connection and filter which also appears on Figure 2.
Figure 14:
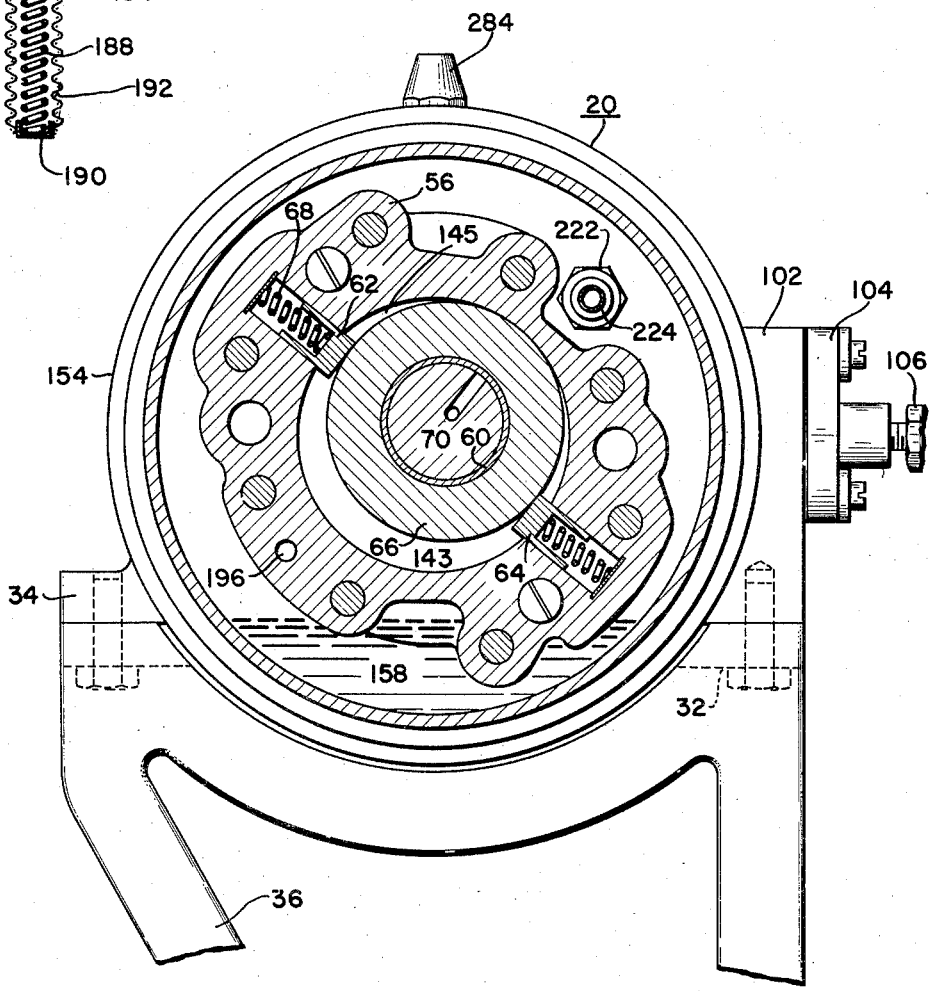
Figure 14 is a sectional view taken substantially along the line 14—14 of Figures 2 and 10.

This inlet passage 172 connects to a well 174. Threaded into the outer end of this well 174 is a combined intake and filter assembly shown inverted in Figure 15. This intake and filter assembly includes a threaded bushing 180 containing the packing 182 and a packing gland 184. The packing gland 184 surrounds a tube 186, the lower and outer end of which is cut off at an angle. The inner end of the tube 186 is provided with a spring retainer ring against which presses a coil spring 188. The other end of this coil spring 188 is held by a spring retainer 190. The spring retainer 190 closes the outer end of a cylindrical screen 192. The inner end of this screen 192 is fastened to the packing gland 184. The spring projects and resiliently holds the lower or outer end of the tube 186 in contact with the adjacent portion of the housing 152. This insures that the oil drawn into the oil pump is taken from the bottom of the lubricant reservoir 158. The coolest oil will naturally be closest to the bottom and therefore the bearings will be supplied with the coolest oil.

The plate 170 is provided with a second passage 194 connecting the discharge chamber of the oil pump with a horizontal passage 196 in the end housing 72 and the cylinder 56 and the side plate 55 and the end housing 86. Also in the end housing 86 is a radially drilled passage 198 connecting with the passage 196 and extending to the seal chamber 202 located in the end housing 86 to provide space for the shaft seal assembly. This floods the seal chamber 202 with cool oil. The seal chamber 202 as well as the main bearing 124 are further cooled by being a part of the end housing 86 in which the cavity 88 surrounds the bearing 124 and the seal chamber. Since this cavity 88 is continuously supplied with cool suction gas during the operation of the compressor, the bearing 124 and the seal chamber 202 are kept cool through their intimate thermal relationship. This prevents failure of lubrication due to overheating of the oil or other lubricant which may be used. From the seal chamber 202, oil is carried through drilled passages 204 in the shaft 46 and branch passages to the bearings 124 and 60 and to their distributing passages 126 and 61. This insures that these bearings, although remote from the oil pump, do obtain an adequate supply at all times.

Whenever more oil is supplied to the seal chamber and other passage 204 than is required, the surplus will leave the seal chamber 202 through the drilled passage 206 which is directly opposite the drilled passage 198 to relieve the excess pressure. Both of these passages 198 and 206 have their outer ends closed by the threaded plugs 208 and 210. Connecting with the passage 206 is a horizontal passage 212. This horizontal passage 212 includes a valve seat member 214 and a valve member 216 which is normally held in closed position against its seat by a conical coil spring 218 extending between the seat member 214 and a nut mounted on the end of the stem of the valve 216. The force of the coil spring 218 is overcome to open the valve member 216 when the pressure upon the valve member 216 rises above about 20 lb./sq. in. above the pressure in the reservoir 158. The valve seat member 214 is held in place by a threaded nipple 220 to which is connected a gland nut 222. This gland nut 222 connects the nipple 220 with a discharge pipe 224 having its outer end directed so as to discharge the lubricant over the outer surface of the hub of the end housing 72. This supplies some cooling to the inner main bearing 160.

The inner main bearing 160 recives its lubrication directly from the oil pump through a shallow groove 226 in the adjacent side wall of the recess 164. Adjacent the eccentric portion 168, the shaft 46 is provided with a portion 228 of reduced diameter forming a shoulder 230. Keyed to this reduced portion 228 is a counterweight 232 having a hub portion 234 which clamps a thrust bearing ring 236 tightly against the shoulder 230. One side of this ring is in contact with the member 170. This ring 236 is surrounded by a spacer ring 238 and a second ring 240 is clamped tightly against the spacer ring 238 by the screws 242. The ring 240 contacts the adjacent face of the thrust ring 236. The spacer ring 238 provides just sufficient spacing between the members 170 and 240 to permit the opposite faces of the ring 236 to serve as bearing surfaces to form a thrust bearing for the shaft 46. This thrust bearing formed by the ring 236 receives adequate lubrication by seepage of lubricant directly from the oil pump recess 164. The pressure in the recess 164 is at least 20 pounds greater than the pressure in the oil reservoir and discharge chamber 148 so that there is an adequate pressure differential to cause the lubricant to move from the oil pump to the thrust bearing surfaces.

The screws 242 also serve to hold an inner casing 244 in place. This inner casing provides a discharge chamber into which the compressed refrigerant discharges from the compressor outlet valves. This forces the discharged refrigerant to reverse its direction of flow and to flow around the rim of the member 244 and then reverse its direction again so that it may pass between the cup member 244 and the adjacent wall of the housing 152. This double reversal tends to separate the oil or other lubricant from the refrigerant discharged from the compressor cylinder. It also causes the compressed gas to be cooled by the cooler walls of the housing 152.

The counterweight 232 cooperates with a weighted portion 246 upon the pulley 44 to balance the eccentric weight of the eccentric portion 70 of the shaft 46 having thereon the added eccentric mass of the compressor roller 66. The counterweight 232 together with the thrust ring 236 is fastened in place by a nut 248 which is threaded onto the adjacent end of the compressor shaft 46 and locked in place by a setscrew 250. To prevent the counterweight 232 from churning up any oil in the reservoir 158, it is enclosed by a flanged cup member 252 fastened to the cup member 244 by the screws 254. The cup member 252 is provided with an outlet opening 256 in its lower portion to allow any lubricant escaping from the thrust bearing to return to the reservoir 158.

The outlet to the housing 152 is provided with a cap member 258 to which is connected an inlet pipe 260. This pipe 260 is provided with an inlet which is shielded by a cap-shaped member 262 fastened to its outer end. This cap-shaped member 262 prevents the entrance of oil into the pipe 260. The outlet to the housing 152 is in the form of a thick ring-shaped member 264 to which is fastened the rear compressor support 38. This outlet is provided with a valve fitting 266 having a projecting portion 268 which is similar to the arrangement shown in Figure 4. This projecting portion 268 engages the guide portion of the automatic valve 270 to hold open the valve 270. The valve 270 is yieldingly urged to closed position by the coil spring 272 held by the spring retainer 274. The spring retainer is retained by the sleeve 280 which is similarly sealed to the opening like the sleeve 120 of Figure 4 and is similarly shaped. The fitting 266 may be provided with a manually operated valve and a flare connection 282 to the pipe 22 connecting with the condenser 24. When the fitting 266 is removed, the valve 270 automatically closes under the force of the spring 272.

The compressor is also provided with a suction gauge connection 284, a discharge pressure gauge connection 286 and a third connection 288. It is also provided with a high pressure safety plug 290 which will open in the event of excessive pressure. Through this construction I have provided a compressor which will perform satisfactorily under the severe conditions present when it is driven by the engine of an automobile. The dual inlet port arrangement provides satisfactory efficiency at all speeds to which the compressor may be required to operate, for example up to 5000 R. P. M.

While the form of embodiment of the invention as herein disclosed constitutes a preferred form, it is to be understood that other forms might be adopted as may come within the scope of the claims which follow.

What is claimed is as follows:

1. A rotary compressor including an impeller shaft, an impeller casing having an impeller chamber containing an impeller and bearings on opposite sides of said chamber for said shaft, said shaft being mounted in said bearings and extending through said chamber, said impeller being drivingly connected to said shaft, the impeller casing being provided with a seal chamber adjacent one of said bearings, a shaft seal in said seal chamber cooperating with said shaft for sealing the shaft entrance to said casing, a lubricant reservoir connected to said casing, pumping and lubricant delivery means driven by said shaft for pumping lubricant from said reservoir first to said seal chamber and then conducting lubricant from the seal chamber to said bearings, said seal chamber being provided with an additional outlet, and a tube extending from said outlet and discharging over one of said bearings.

2. A rotary compressor including an impeller shaft, an impeller casing having an impeller chamber containing an impeller and bearings on opposite sides of said chamber for said shaft, said shaft being mounted in said bearings and extending through said chamber, said impeller being eccentrically mounted on said shaft, a housing surrounding a portion of said casing, said housing being spaced from but sealed to said casing to form an enclosed lubricant chamber, a counterweight mounted upon said shaft outside of said casing but within said housing, a drive pulley provided with an eccentrically weighted mass mounted upon the other end of said shaft outside of said casing, said counterweight and said eccentrically weighted mass being positioned relative to said eccentrically mounted impeller so as to counterbalance said impeller, and a casing within said housing enclosing said counterweight.

3. A rotary compressor including an impeller shaft, an impeller casing having an impeller chamber containing an impeller and bearings on opposite sides of said chamber for said shaft, said shaft being mounted in said bearings and extending through said chamber, said impeller being drivingly connected to said shaft, one end of said shaft being provided with a shoulder, a first ring mounted on and fixed to said shaft, means for holding said ring against said shoulder, said casing being provided with a bearing surface in bearing contact with one face of said ring, a second ring attached to said casing having a bearing surface in bearing contact with the opposite face of said first ring, and means for holding said bearing surfaces in spaced relation just sufficient to provide bearing clearances with the first ring.

4. A rotary compressor including an impeller shaft, an impeller casing having an impeller chamber containing an impeller and bearings on opposite sides of said chamber for said shaft, said shaft being mounted in said bearings and extending through said chamber, said impeller being drivingly connected to said shaft, a lubricant reservoir connected to said casing, lubricant pumping means driven by said shaft, said lubricant pumping means including a movable inlet tube extending into said reservoir and a spring means for resiliently urging said inlet tube to the bottom of said reservoir.

5. A rotary compressor including an impeller shaft, an impeller casing having an impeller chamber containing an impeller and bearings on opposite sides of said chamber for said shaft, said shaft being mounted in said bearings and extending through said chamber, said impeller being drivingly connected to said shaft, a lubricant reservoir connected to said casing, lubricant pumping means driven by said shaft, said lubricant pumping means including a movable inlet tube extending into said reservoir and a spring means for resiliently urging said inlet tube to the bottom of said reservoir, and a packing gland seal for sealing said tube to said pumping means.

6. A rotary compressor including an impeller shaft, an impeller casing having an impeller chamber containing an impeller and bearings on opposite sides of said chamber for said shaft, said shaft being mounted in said bearings and extending through said chamber, said impeller being drivingly connected to said shaft, said shaft being provided with an eccentric portion on the outside of said casing, a lubricant pump roller mounted on said eccentric portion, one face of said casing being recessed to form a lubricant pumping chamber cooperating with said roller, a stationary ring on the side of said face cooperating with said recess and said roller to close the lubricant pumping chamber, a shaft ring fixed to said shaft having one face in bearing contact with said stationary ring, a second ring attached to said casing having a bearing surface in bearing contact with the opposite face of said shaft ring, and means for holding said bearing surfaces in spaced relation just sufficient to provide bearing clearances with the shaft ring.

7. A rotary compressor including an impeller shaft, an impeller casing having an impeller chamber containing an impeller and bearings on opposite sides of said chamber for said shaft, said shaft being mounted in said bearings and extending through said chamber, said impeller being drivingly connected to said shaft, the impeller casing being provided with a seal chamber adjacent one of said bearings, a shaft seal in said seal chamber cooperating with said shaft for sealing the shaft entrance to said casing, a lubricant reservoir connected to said casing, pumping and lubricant delivery means driven by said shaft for pumping lubricant from said reservoir first to said seal chamber and then conducting lubricant from the seal chamber to said bearings, said seal chamber being provided with an additional outlet, a tube extending from said outlet and discharging over one of said bearings, and a pressure relief valve connected in series with said outlet for preventing the flow of lubricant through said additional outlet and said tube whenever the pressure within said seal chamber is below a predetermined value.

8. A rotary compressor including an impeller shaft, an impeller casing having an impeller chamber containing an impeller and bearings on opposite sides of said chamber for said shaft, said shaft being mounted in said bearings and extending through said chamber, said impeller being drivingly connected to said shaft, a lubricant reservoir connected to said casing, lubricant pumping means driven by said shaft, said lubricant pumping means including a movable inlet tube extending into said reservoir and a spring means for resiliently urging said inlet tube to the bottom of said reservoir, a packing gland seal for sealing said tube to said pumping means, a tubular screen surrounding said spring means and connected at one end to the packing gland seal and provided with a spring retainer means adjacent its opposite end for supporting said spring means.

9. A rotary compressor including an impeller shaft, an impeller casing having an impeller chamber containing an impeller and bearings on opposite sides of said chamber for said shaft, said shaft being mounted in said bearings and extending through said chamber, said impeller being drivingly connected to said shaft, one end of said shaft being provided with a shoulder, a first ring mounted on and fixed to said shaft, means for holding said ring against said shoulder, said casing being provided with a bearing surface in bearing contact with one face of said ring, a second ring attached to said casing having a bearing surface in bearing contact with the opposite face of said first ring, means for holding said bearing surfaces in spaced relation just sufficient to provide bearing clearances with the first ring, said casing being provided with a recess between said first ring and the nearest bearing, and a lubricant pump impeller located in said recess operatively connected to said shaft for pumping lubricant to said bearings.

References Cited in the file of this patent
UNITED STATES PATENTS

| | | |
|---|---|---|
| 1,603,426 | Thomson | Oct. 19, 1926 |
| 1,615,824 | Bell | Feb. 1, 1927 |
| 1,636,486 | Planche | July 19, 1927 |
| 2,159,720 | Wahlmark | May 23, 1939 |
| 2,165,620 | Doeg | July 11, 1939 |
| 2,246,610 | Wagner | June 24, 1941 |
| 2,289,441 | Valley et al. | July 14, 1942 |
| 2,305,317 | Nickell | Dec. 15, 1942 |
| 2,309,577 | Davidson | Jan. 26, 1943 |
| 2,309,683 | Wahlmark | Feb. 2, 1943 |
| 2,323,802 | Dick et al. | July 6, 1943 |
| 2,361,855 | McCormack | Oct. 31, 1944 |
| 2,476,383 | Porteous | July 19, 1949 |
| 2,544,144 | Ellis | Mar. 6, 1951 |
| 2,633,292 | Voznica | Mar. 31, 1953 |

FOREIGN PATENTS

| | | |
|---|---|---|
| 218,852 | Great Britain | July 17, 1924 |
| 575,709 | France | Apr. 26, 1924 |